United States Patent
Tseng et al.

(10) Patent No.: US 9,285,486 B2
(45) Date of Patent: Mar. 15, 2016

(54) METHOD FOR RADIATION DETECTION SIGNAL PROCESSING

(71) Applicant: Institute of Nuclear Energy Research Atomic Energy Council, Executive Yuan, Taoyuan County (TW)

(72) Inventors: Sheng-Pin Tseng, Taoyuan County (TW); Ming-Lee Chu, Taoyuan County (TW); Meei-Ling Jan, Taoyuan County, TN (US)

(73) Assignee: INSTITUTE OF NUCLEAR ENERGY RESEARCH ATOMIC ENERGY COUNCIL, EXECUTIVE YUAN, Taoyuan County (TW)

( * ) Notice: Subject to any disclaimer, the term of this patent is extended or adjusted under 35 U.S.C. 154(b) by 0 days.

(21) Appl. No.: 14/518,120

(22) Filed: Oct. 20, 2014

(65) Prior Publication Data

US 2015/0115167 A1    Apr. 30, 2015

(30) Foreign Application Priority Data

Oct. 28, 2013    (TW) .............................. 102138918 A

(51) Int. Cl.
G01T 1/18 (2006.01)
G01T 1/17 (2006.01)
G01T 1/24 (2006.01)

(52) U.S. Cl.
CPC .. *G01T 1/171* (2013.01); *G01T 1/24* (2013.01)

(58) Field of Classification Search
CPC ......................................................... G01T 1/24
USPC ............................................ 250/375, 370.01
See application file for complete search history.

(56) References Cited

U.S. PATENT DOCUMENTS 4,486,663 A * 12/1984 Arseneau ................. 250/363.02
2004/0017224 A1 * 1/2004 Tumer et al. .................... 327/51

* cited by examiner

*Primary Examiner* — David Porta
*Assistant Examiner* — Meenakshi Sahu
(74) *Attorney, Agent, or Firm* — WPAT, PC; Justin King

(57) ABSTRACT

The invention relates to a method for radiation detection signal processing, and more particularly to a method capable of using a periodic signal to control the time of charging/discharging to a capacitor of an integrator. The method can be used for detecting the energy of incident photon of Gamma ray during the happening of an event while reducing dead time, and thereby, the count rate is increased. As the periodic signal is used as the signal for controlling the time of charging/discharging to a capacitor, the charging/discharging time of the integrator is no longer being controlled by the triggering time of the event, and thus, the present method is advantageous in that: the control method and circuit architecture are comparatively simpler since the charging/discharging time of the integrator no longer required to be controlled precisely, and thus the integration error due to insufficient resolution in delay element can be avoided.

8 Claims, 6 Drawing Sheets

METHOD FOR RADIATION DETECTION SIGNAL PROCESSING

FIELD OF THE INVENTION

The present invention relates to a method for radiation detection signal processing, and more particularly, to a method designed to use periodic signals for controlling the time of charging/discharging to a capacitor of an integrator instead of the use of signals relating to event triggering time, and thus, the integration error due to insufficient resolution in a delay element can be avoided, since the signals of event triggering time are no longer required to be delayed by the delay element used for controlling the timing of charging/discharging of the integrator.

BACKGROUND OF THE INVENTION

For the past two decades, it is generally agreed that the most important development in nuclear medical imaging technology is the technique of positron emission tomography (PET), which is a nuclear medical imaging technique that produces a three-dimensional functional image or picture in the body. Operationally, a short-lived radioactive tracer isotope is injected into the living subject, usually into blood circulation through an intravenous glucose injection process, for allowing the radioactive tracer isotope to be chemically incorporated into malignant cancer cells. The radionuclide in the radiotracer decays and the resulting positrons subsequently annihilate on contact with electrons after traveling a short distance within the body. The encounter annihilates both electron and positron, producing a pair of annihilation (gamma) photons moving in approximately opposite directions, that is this electron-positron annihilation results in two 511 keV gamma photons ($\gamma$-ray) being emitted at almost 180 degrees to each other. Then, these pairs of annihilation (gamma) photons are collected by a PET scanner to be used in an image reconstruction process for obtaining molecular biology details of the living subject.

The count rate is an important factor regarding to the overall performance of a PET system, as a PET system with a high count rate, the imaging time required can be significantly reduced while still obtaining sufficient data. In addition, with the decreasing in imaging time, the acceptance of a patient to a PET scan procedure is increased as the pain and time required for the patient to remain still on a PET scanner is shortened significantly. Consequently, with the increasing amount of patients who are willing to take PET scanning, the amount of hospital willing to purchase the PET system is increased.

In a PET scanner, after an optical signal is converted into an electric signal by the use of scintillation crystal array in conjunction with photomultiplier tubes, the electric signal is fed to a circuit so as to produce a plurality of signals containing data relating to incident photon energy and location. Thereafter, the so-produced signals are sent to the integrators of the PET scanner so as to be used for determining values relating to incident photon energy according to the charge of capacitors in the integrators, and then the values are applied in a calculation so as to obtain the relative energy of incident photon and localize the annihilation event. However, after being charged, each integrator must be discharged before it can become available for processing next event, and thus, during the performing of a PET scan with high count rate, there can be a number of events that can be missed as they are happening during the discharging of integrator, which adversely impacts the count rate.

Conventionally, to reduce the effect of the dead time of the integrator on the overall system, there are generally multiple integrators to be used on each signal, as the two integrators shown in FIG. 1. In FIG. 1, a control unit 11 is enabled by an event triggering signal to issue integration control signals for controlling the charging/discharging of capacitors in corresponding integrators and a multiplexer control signal for controlling a multiplexer. According to the integration control signals from the control unit 11, a first integrator 12 or a second integrator 13 is selected to perform an integration to an input signal or to perform a discharging process while enabling the control unit 11 to issue a multiplexer control signal according to the selected integrator so as to control the multiplexer 14 to output signals from the selected integrator, which can be the first integrator 12 or the second integrator 13, as an output signal. Generally, the first integrator 12 and the second integrator 13 are selected alternately in a chronological order, as shown in FIG. 2. It is noted that the selection of integrators and the initiation of a integration period of a selected integrator is not enabled periodically, but is based upon the time when an event occurred. Therefore, the starting time of an integration period on a selected integrator must be controlled precisely and accurately to meet exactly to the time when an event occurred, and thus both the circuit architecture and the control method of the aforesaid integrators can be comparatively very complex.

SUMMARY OF THE INVENTION

In view of the disadvantages of prior art, the primary object of the present invention is to provide a method for radiation detection signal processing, which uses a periodic signal to control the time of charging/discharging to a capacitor of an integrator. The method can be used for detecting the relative energy of incident photon of Gamma ray during the happening of an event while reducing dead time, and thereby, the count rate is increased. As the periodic signal is used and defined to be the control signal for controlling the time of charging/discharging to a capacitor of an integrator, the charging/discharging time of the integrator is no longer being controlled by the triggering time of the event, and thus, comparing to the prior arts, the method of the present invention is advantageous in that: the control method and circuit architecture are comparatively simpler since the timing of charging/discharging of the integrator no longer required to be controlled precisely, and thus the integration error due to insufficient resolution in delay element can be avoided.

To achieve the object, the present invention provides a method for radiation detection signal processing, which comprises the steps of:

(a) A probe of an instrument is used to detect gamma-rays.

(b) using a photoelectric conversion device in the probe to convert the emitted gamma ray into at least one electric signal;

(c) feeding the at least one electric signal to a time discriminator so as to acquire an event time data;

(d) feeding the at least one electric signal to at least two integrators simultaneously for integration while enabling a control unit to issue at least two periodic signals of compatible waveforms but with different phases to be used for controlling each of the at least two integrators to perform a repeated integration and discharging process upon the at least one electric signal inputted thereto; and (e) outputting results of all the integrators to a multiplexer and feeding the event time data to the control unit for allowing the control unit to compare the event time data with the at least two periodic signals so as to issue a multiplexer control signal according to the comparison to be used for controlling the multiplexer to select one integrator from the at least two integrators based upon the multiplexer control signal and thus to output the result of the repeated integration process of the selected integrator.

In an exemplarily embodiment, the step (b) further comprises: a signal baseline restoration process.

In an exemplarily embodiment, the signal baseline restoration process is performed by a signal baseline restorer.

In an exemplarily embodiment, the photoelectric conversion device is substantially a photomultiplier tube.

In an exemplarily embodiment, the instrument is substantially a device selected from the group consisting of: a PET device and a SPECT device.

From the above description, it is noted that the method of the present invention has the following characteristics:

(1) It is a control method that is specially designed for recovering the adverse impact caused by the feeding of radiation detection signals into integration circuits at the capacitor discharging periods when the integration circuits is busy and incapable of processing the radiation detection signals, and thus for reducing the loss in count rate.

(2) As the periodic signal is used and defined to be the control signal for controlling the time of charging/discharging to a capacitor of an integrator, the charging/discharging time of the integrator is no longer being controlled by the triggering time of event, and thus, comparing to the prior arts, the method of the present invention is advantageous in that: the control method and circuit architecture are comparatively simpler.

(3) The integration error due to insufficient resolution in delay elements can be avoided, since it is no longer required to use the delay elements for delaying the triggering time of event for controlling the start of capacitor charging/discharging time.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
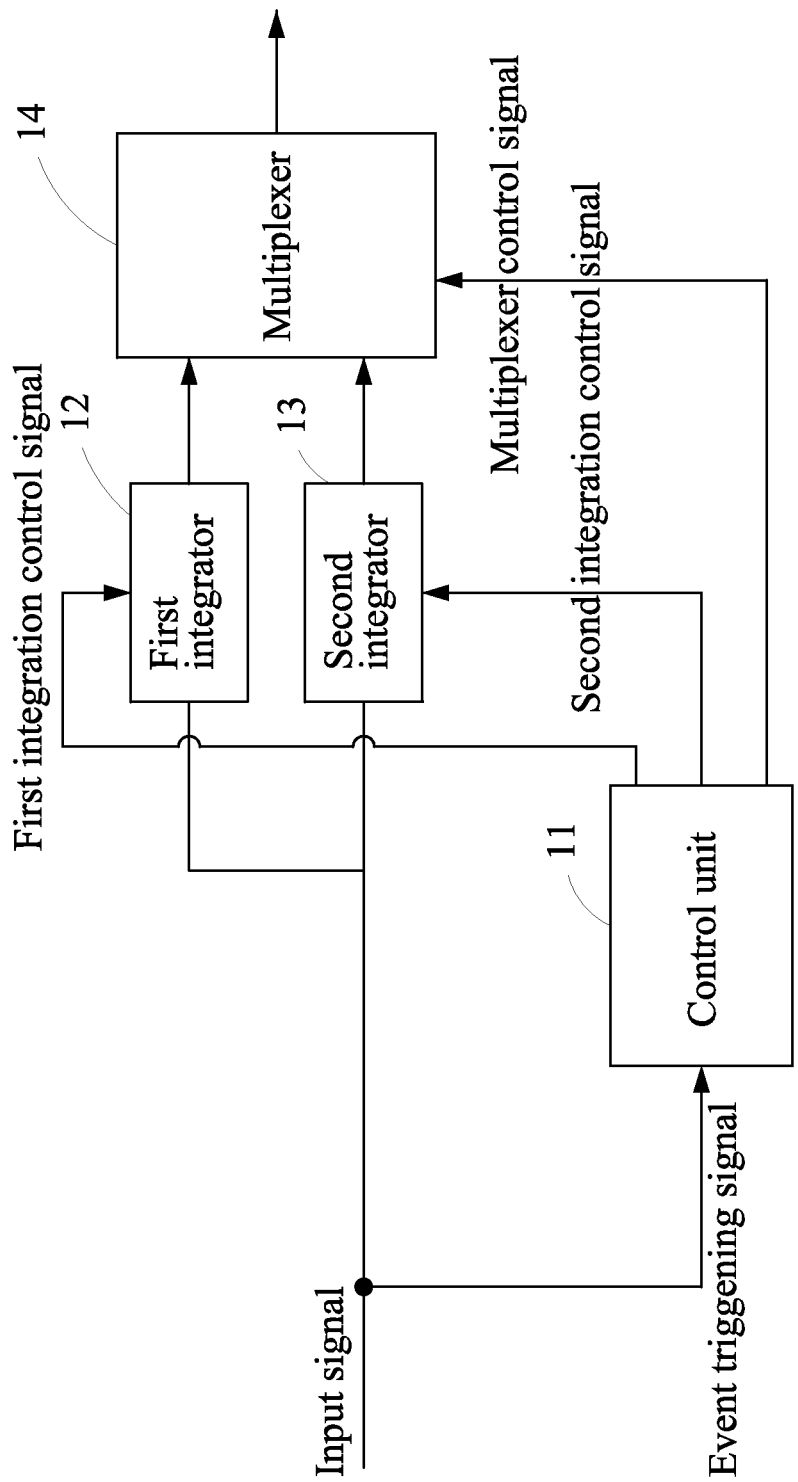
FIG. 1 is a functional block diagram showing a conventional radiation detection signal processing apparatus.
Figure 2:
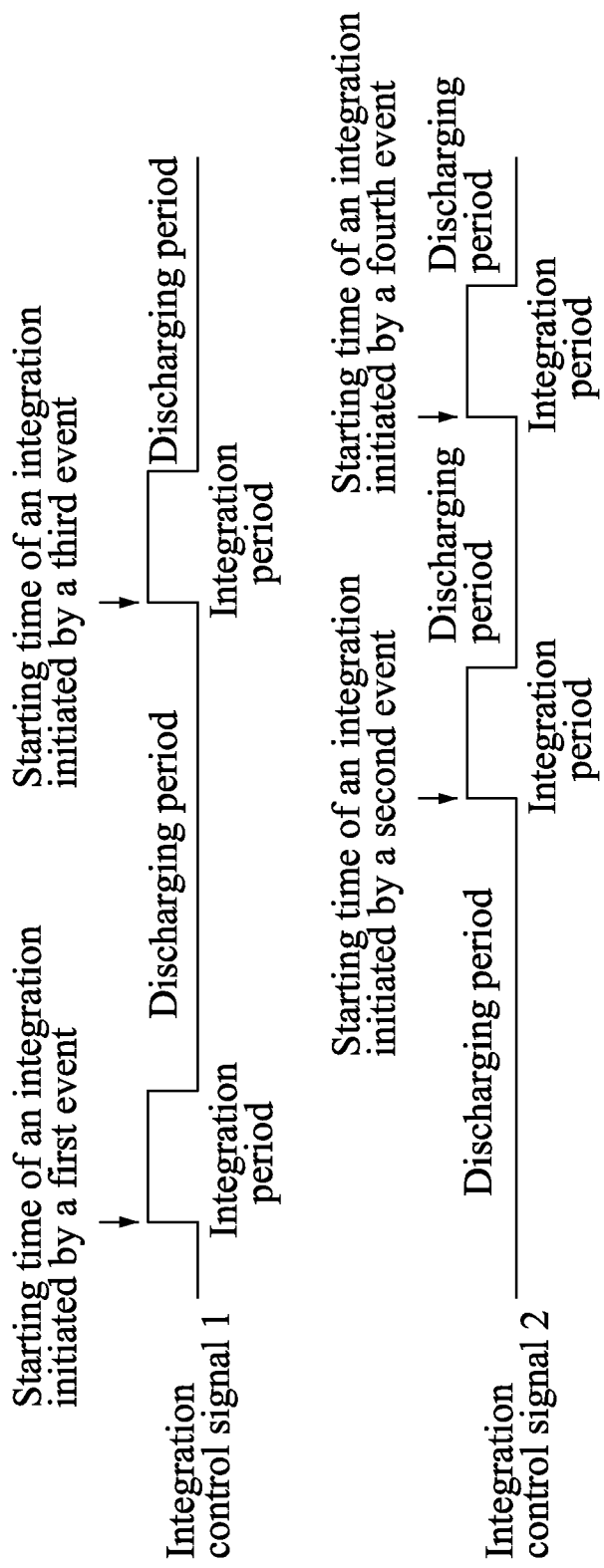
FIG. 2 is a time sequence diagram showing the use of conventional control signals for controlling the charging/discharging of two integrators in a conventional apparatus.
Figure 3:
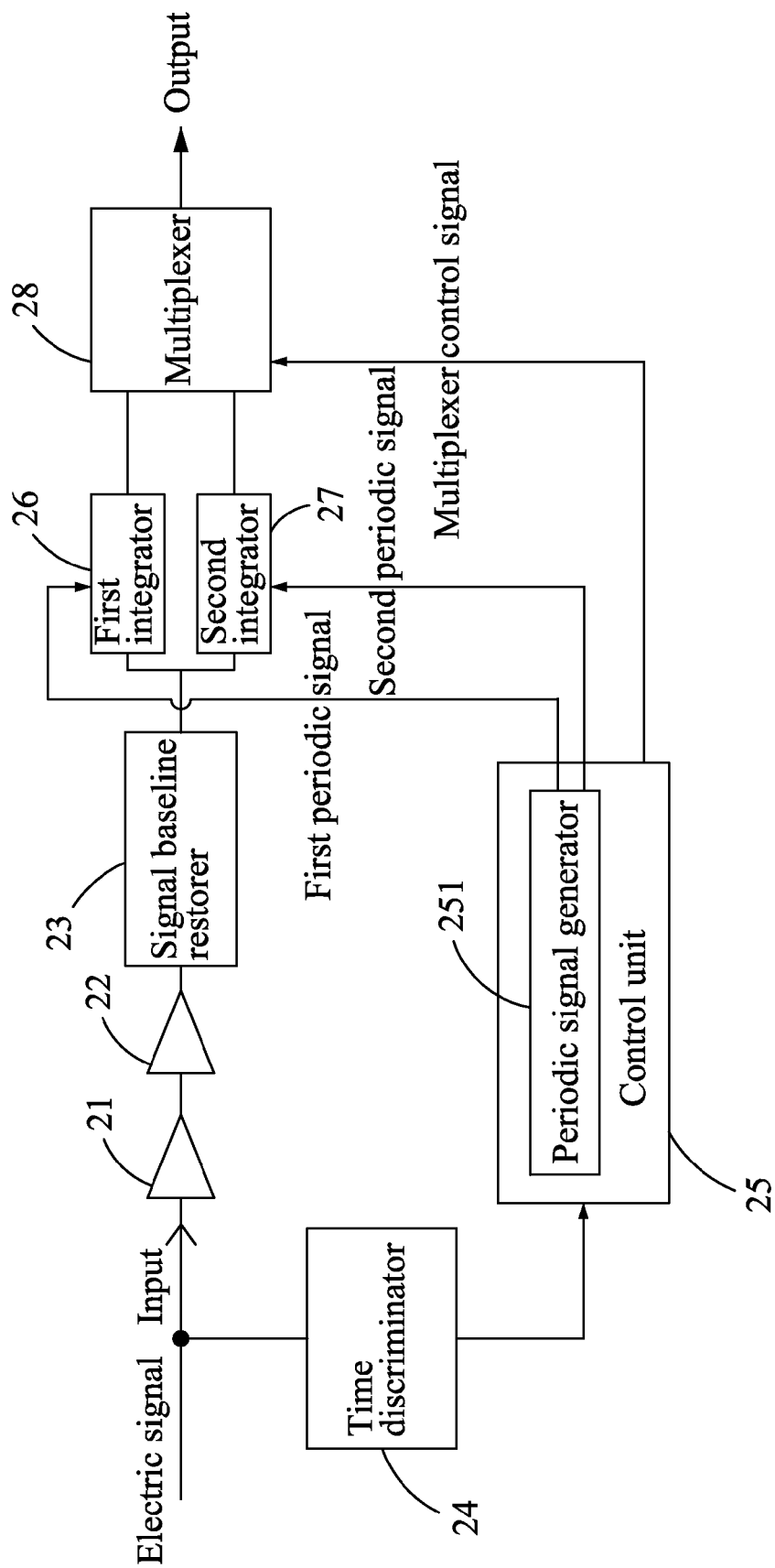
FIG. 3 is a functional block diagram showing a radiation detection signal processing apparatus according to the present invention.

Please refer to FIG. 3, which is a functional block diagram showing a radiation detection signal processing apparatus according to the present invention. In this embodiment, the apparatus provided is used for processing analog signal, but only for illustration and not limited thereby. As shown in FIG. 3, The radiation detection signal processing apparatus comprises: a low-noise amplifier 21, a variable-gain amplifier 22, a signal baseline restorer 23, a time discriminator 24, a control unit 25, a first integrator 26, a second integrator 27 and a multiplexer 28, in which the control unit further configured with a periodic signal generator 251, that is to be used for generating at least two periodic signals for controlling the discharging/charging of the first and the second integrators 26, 27. Comparing with prior arts, the method of the present invention is advantageous in that: the control method and circuit architecture are comparatively simpler, as the charging/discharging to the capacitors of the two integrators 26, 27 is controlled by the periodic signal, and is no longer being controlled based on the triggering time of event, that is, the starting time of an integration period on any integrator does not required to be control precisely and accurately to meet exactly to the time when an event occurred, and thus, comparing to the prior arts, the method of the present invention is advantageous in that: the control method and circuit architecture are comparatively simpler.

Figure 4:
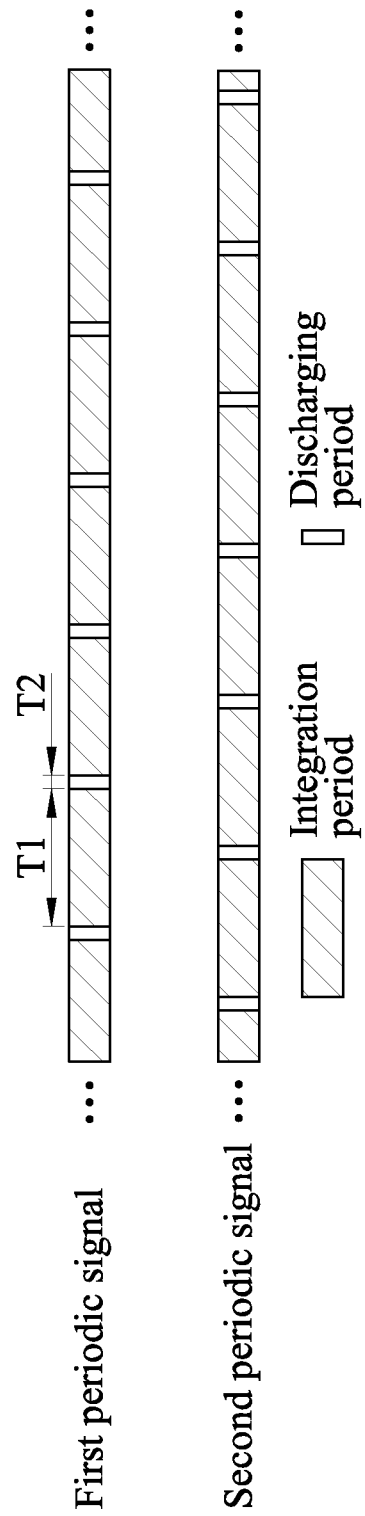
FIG. 4 is a time sequence diagram showing the use of periodic signals for controlling the charging/discharging of two integrators in a radiation detection signal processing apparatus of the present invention.
Figure 5:
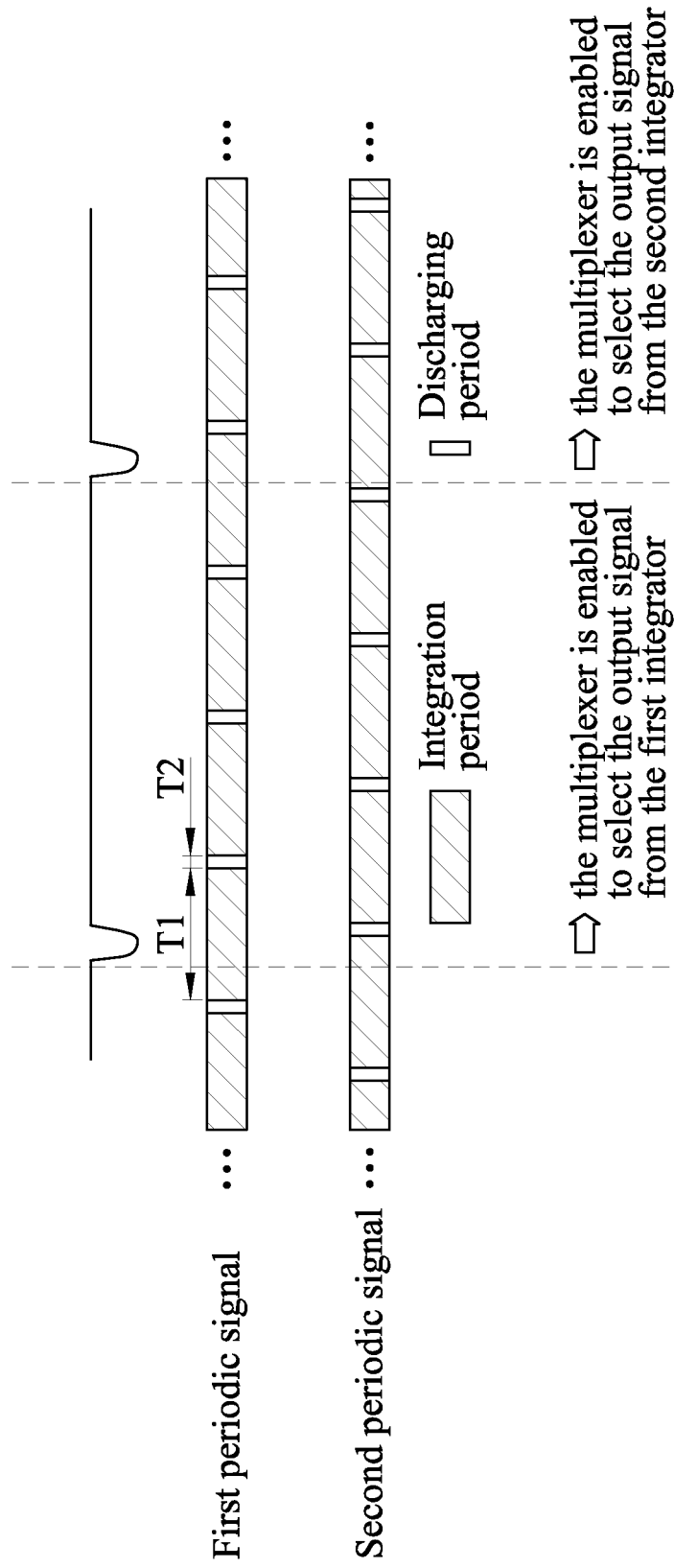
FIG. 5 is a schematic diagram showing the use of periodic signals for controlling the charging/discharging of two integrators in a radiation detection signal processing apparatus of the present invention.

As shown in FIG. 4 and FIG. 5, the areas that are larger in size are defined to be integration periods, while the areas that are smaller are defined to be discharging periods, and both the durations of the integration period $T_1$ and the discharging period $T_2$ are fixed. In addition, the first periodic signal is offset from the second periodic signal by a phase. In an embodiment where there are two integrators, the phase difference is about 180 degrees, while in an embodiment where there are three integrators, the phase difference is about 120 degrees, and so on. The control unit is enabled to issue a multiplexer control signal for controlling the multiplexer 28, by that the multiplexer 28 is controlled to select one integrator from the two integrators 26, 27 based upon an event trigging time and thus to output the integration result of the selected integrator as the output of the multiplexer 28. For instance, when a radiation detection signal is issued and received at the time when the first integrator 26 is not situated in its discharging period, the multiplexer 28 is enabled to select the output signal from the first integrator 26, and similarly, when a radiation detection signal is issued and received at the time when the second integrator 27 is not situated in its discharging period, the multiplexer 28 is enabled to select the output signal from the second integrator 27.

Figure 6:
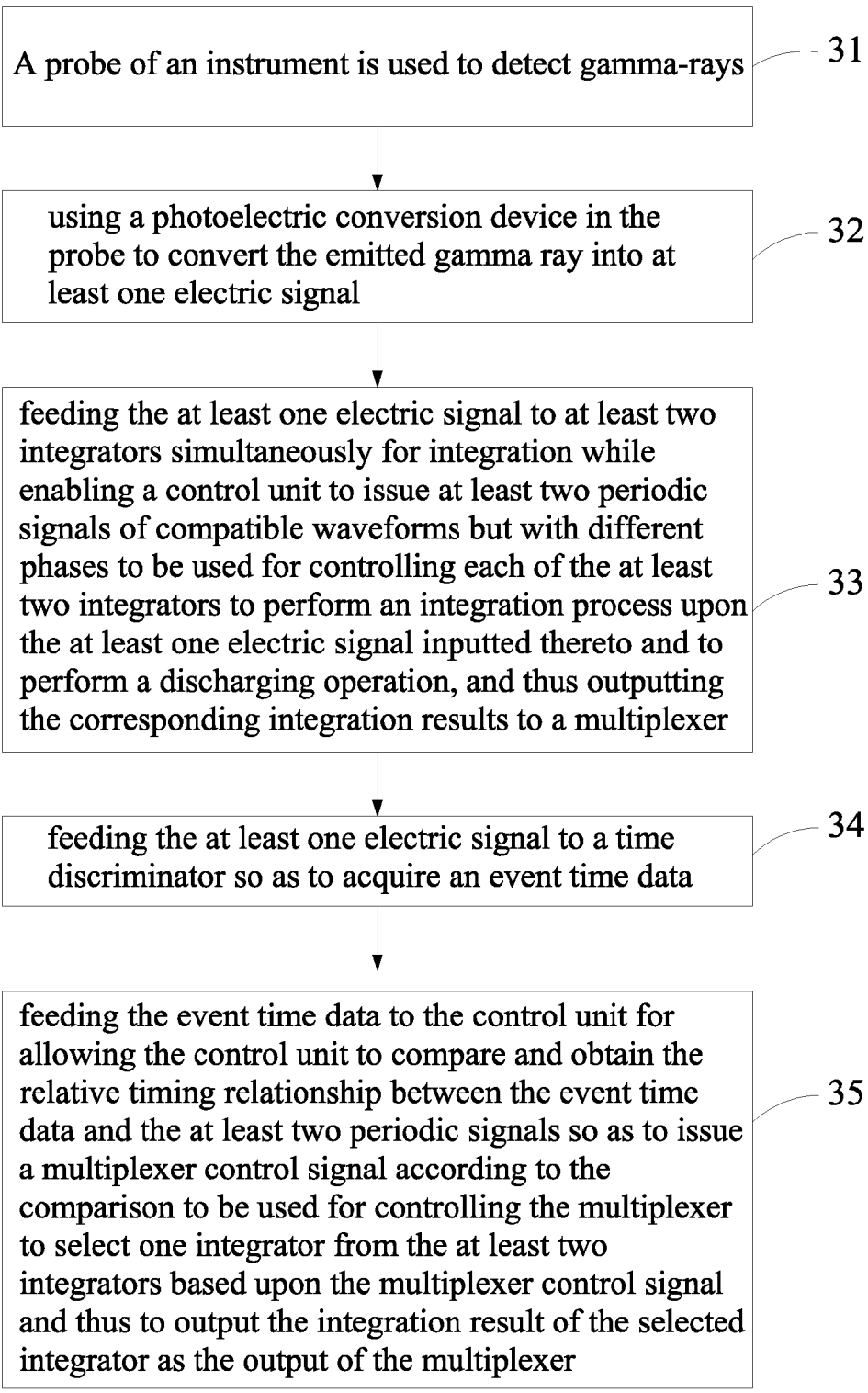
FIG. 6 is a flow chart depicting the step performed in a method for radiation detection signal processing according to the present invention.

Please refer to FIG. 6, which is a flow chart depicting the step performed in a method for radiation detection signal processing according to the present invention. As shown in FIG. 6, the method for radiation detection signal processing comprises the steps of:

31 A probe of an instrument is used to detect gamma-rays; whereas the instrument can be a positron emission tomography (PET) device or a single-photon emission computed tomography (SPECT) device.

32 using a photoelectric conversion device in the probe to convert the emitted gamma ray into at least one electric signal; whereas the photoelectric conversion device is substantially a photomultiplier tube.

33 Feeding the electric signal to a low-noise amplifier, a variable-gain amplifier, and a signal baseline restorer for processing.

34 Using a processor to process the electric signal so as to obtain an event time data whereas the processor can be a time discriminator.

35 feeding the event time data to a control unit for allowing the control unit to compare and obtain the relative timing relationship between the event time data and the at least two periodic signals so as to issue a multiplexer control signal according to the comparison to be used for controlling the multiplexer to select one integrator from the at least two integrators based upon the multiplexer control signal and thus to output the integration result of the selected integrator as the output of the multiplexer; whereas the selection of the integrator is performed in a manner as following: comparing the duration of the electric signal of the event of gamma ray emission from the beginning to the end with the durations of discharging periods of the at least two integrators; and if the duration of the electric signal did not fall within any of the durations of discharging periods of the at least two integrators, the multiplexer is enabled to selected the outputs of at least two integrators as the output of the multiplexer.

Moreover, the integration (charging) and discharging of the at least two integrators are controlled by the periodic signals of compatible waveforms but with different phases. In an embodiment where there are two integrators, the phase difference is about 180 degrees, while in an embodiment where there are three integrators, the phase difference is about 120 degrees, and so on. Thereafter, the process results of all the integrators are sent to a multiplexer, whereas the multiplexer is controlled by a multiplexer control signal from the control unit so as to select one integrator from the at least two integrators based upon the multiplexer control signal and thus to output the integration result of the selected integrator as the output of the multiplexer. Finally, a fixed value is subtracted from the output of the multiplexer for calibrating DC offset.

From the description illustrated in FIG. 3 to FIG. 6, the present invention relates to a method for radiation detection signal processing, and more particularly to a method capable of using a periodic signal to control the time of charging/discharging to a capacitor of an integrator. The method can be used for detecting the relative energy of incident photon of Gamma ray during the happening of an event while reducing dead time, and thereby, the count rate is increased. As the periodic signal is used and defined to be the control signal for controlling the time of charging/discharging to a capacitor of an integrator, the start of charging/discharging time of the integrator is no longer being controlled by the triggering time of the event, and thus, comparing to the prior arts, the method of the present invention is advantageous in that: the control method and circuit architecture are comparatively simpler since the timing of charging/discharging of the integrator no longer required to be controlled precisely, and thus the integration error due to insufficient resolution in delay element can be avoided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A method for radiation detection signal processing, comprising the steps of:
    (a) using a probe of an instrument to detect ionizing radiation;
    (b) using a photoelectric conversion device in the probe to convert the emitted ionizing radiation into at least one electric signal;
    (c) feeding the at least one electric signal to at least two integrators simultaneously for integration while enabling a control unit to issue at least two periodic signals of compatible waveforms but with different phases to be used for controlling each of the at least two integrators to perform an integration process upon the at least one electric signal inputted thereto and to perform a discharging operation, and thus outputting the corresponding integration results to a multiplexer;
    (d) feeding the at least one electric signal to a time discriminator so as to acquire an event time data; and
    (e) feeding the event time data to the control unit for allowing the control unit to compare and obtain the relative timing relationship between the event time data and the at least two periodic signals so as to issue a multiplexer control signal according to the comparison to be used for controlling the multiplexer to select one integrator from the at least two integrators based upon the multiplexer control signal and thus to output the integration result of the selected integrator as the output of the multiplexer.

2. The method for radiation detection signal processing of claim 1, wherein the selection of the integrator in the step (e) is performed in a manner as following: comparing the duration of the electric signal of the event of gamma ray emission from the beginning to the end with the durations of discharging periods of the at least two integrators; and if the duration of the electric signal did not fall within any of the durations of discharging periods of the at least two integrators, the multiplexer is enabled to selected the outputs of at least two integrators as the output of the multiplexer.

3. The method for radiation detection signal processing of claim 1, wherein the photoelectric conversion device of step (b) is substantially a photomultiplier tube.

4. The method for radiation detection signal processing of claim 1, wherein the photoelectric conversion device of step (b) is substantially a low-noise amplifier.

5. The method for radiation detection signal processing of claim 1, wherein the photoelectric conversion device of step (b) is substantially a variable-gain amplifier.

6. The method for radiation detection signal processing of claim 1, wherein the photoelectric conversion device of step (b) is substantially a signal baseline restorer.

7. The method for radiation detection signal processing of claim 1, wherein the control unit further comprises:
    a periodic signal generator, for generating the at least two periodic signal to be used for controlling the operations of the at least two integrators.

8. The method for radiation detection signal processing of claim 1, wherein the instrument is substantially a device selected from the group consisting of: a positron emission tomography (PET) device, a single-photon emission computed tomography (SPECT) device and an X-ray detector device.

* * * * *